United States Patent [19]

Mizumoto et al.

[11] Patent Number: 5,192,902
[45] Date of Patent: Mar. 9, 1993

[54] VELOCITY/PHASE CONTROLLER FOR DC SERVO MOTOR

[75] Inventors: Masao Mizumoto; Kouichirou Ougino; Tsutomu Shimazaki, all of Oura; Tomohiro Inoue; Yasuhiro Okada, both of Yonago, all of Japan

[73] Assignees: Sanyo Electric Co., Ltd.; Matsushita Electric Industrial Co., Ltd., both of Osaka, Japan

[21] Appl. No.: 607,673

[22] Filed: Nov. 1, 1990

[30] Foreign Application Priority Data

Nov. 10, 1989 [JP] Japan .................................. 1-292819

[51] Int. Cl.⁵ ............................................. G05B 13/00
[52] U.S. Cl. .................................................. 318/561
[58] Field of Search ................ 318/561, 603, 608, 636

[56] References Cited

U.S. PATENT DOCUMENTS

| | | | |
|---|---|---|---|
| 4,418,304 | 11/1983 | Iwai | 318/311 |
| 4,605,884 | 8/1986 | Miyazi | 318/636 X |
| 4,814,679 | 3/1989 | Shizemori | 318/318 |

FOREIGN PATENT DOCUMENTS

| | | |
|---|---|---|
| 2901705A1 | 7/1979 | Fed. Rep. of Germany . |
| 2925583C2 | 1/1980 | Fed. Rep. of Germany . |
| 3323600A1 | 1/1984 | Fed. Rep. of Germany . |
| 3810288A1 | 10/1988 | Fed. Rep. of Germany . |

OTHER PUBLICATIONS

German Search Report of Jul. 1, 1991, H02P 5/00, 5/06, 7/18.
Aufbau und Arbeitsweise Digitaler Pll-Schaltungen, Elektronik-Arbeitsblatt Nr. 165, pp. 57-60.

Primary Examiner—William M. Shoop, Jr.
Attorney, Agent, or Firm—Oliff & Berridge

[57] ABSTRACT

A controller for properly controlling a rotating speed and a rotational phase of a DC servo motor. A velocity correction signal is obtained by comparing a rotation signal detected from the motor rotating at a predetermined rotating speed, and a phase error signal is detected from the rotation detected signal as well. Both the rotating velocity and phase of the motor are corrected by the controller supplying a signal which is a mix of the velocity error signal and the phase error signal. The invention includes: a velocity control circuit including a trigger pulse generation circuit for producing a trigger pulse, in synchronization with a reference clock signal, from a rotation signal detected in response to the rotation of a motor, a counter for counting the reference clock signal and for outputting a count termination signal when a counted value reaches a preset value, and an output circuit for outputting, in response to the trigger pulse and the count termination signal, either a fast signal representing that the motor rotates faster than a predetermined rotating speed or a slow signal representing that the motor rotates slower than the predetermined speed; the invention further includes a phase control circuit for outputting in resones to a phase difference between the reference signal representing that the motor rotates at the predetermined speed and the rotation detection signal, either an advance signal representing that a phase-angle of the motor is advanced with respect to a predetermined value or a delay signal representing that a phase-angle of the motor is retarded with respect to the predetermined value; and a mixer for mixng an output from the velocity control signal circuit and an output from the phase control circuit, whereby the velocity control of the motor is executed prior to the phase control thereof.

11 Claims, 9 Drawing Sheets

VELOCITY/PHASE CONTROLLER FOR DC SERVO MOTOR

DETAILED DESCRIPTION OF THE INVENTION

1. Field of the Invention

This invention relates to a control circuit, for use in a motor, for controlling a rotating speed and a rotational phase of a DC servo motor.

2. Description of the Related Art

Generally, a motor control circuit shown in FIG. 8 is typically used for controlling a velocity of a DC servo motor.

In FIG. 8, a reference numeral 1 designates a ½ divider, and the ½ divider 1 divides a frequency of a detected FG pulse. The FG pulse is produced in response to a rotation of a not-illustrated motor, and the divider outputs a ½ FG signal and a $\overline{½\,FG}$ signal. A reference numeral 2 designates a trigger pulse generator circuit, for producing trigger pulses T1, T2, to which inverted reference clock signal $\overline{CKO}$, obtained by inverting a reference clock signal CKO at an inverter 14, the ½ FG signal, and the $\overline{½FG}$ signal are applied. Specifically, in the trigger pulse generator circuit 2, when the ½ FG signal rises, there is outputted a trigger pulse T1, which becomes "0" during either a level "1" state or a level "0" state of the inverted clock signal $\overline{CKO}$ in synchronization with the same. Meanwhile, when the $\overline{½\,FG}$ signal rises; namely, the ½ FG signal decays, there is produced a trigger pulse T2 which becomes "0" during either a level "1" state or a level "0" state of the inverted clock signal $\overline{CKO}$ in synchronization with the same.

A reference numeral S designates an R-S flip flop (hereinafter referred to as RS F/F) composed of NAND gates 4 and B. At one input terminal of the NAND gate 4, the trigger pulse T1 is applied. A reference numeral designates a counter, to which an output $\overline{Q1}$ from the RS F/F and the reference clock signals are applied, for producing a count termination signal R1 to be applied to one of the input terminals of the NAND gate B. In detail, the counter 0 is once reset, and starts a counting operation at the trailing edge of the output $\overline{Q1}$ of "0" from the RS F/F 3, then produces the count termination signal R1 of "0" when a counted value reaches a preset value.

Consequently, the RS F/F S produces the output Q1 that has a constant pulse width and is determined on the basis of both the preset value of the counter 6 and the cycle of the clock CKO.

In the same manner that the RS F/F 3 and the counter 6 are provided to the trigger pulse T1, there is provided an RS F/F 7 and a counter 10 to the trigger pulse T2.

A reference numeral 7 designates an RS F/F composed of NAND gates 8, 9. To one input terminal of the NAND gate 8 is applied the trigger pulse T2. A reference numeral 10 designates a counter, to which the output $\overline{Q2}$ from the RS F/F 7 and the reference clock signal CKO are applied, for producing a count termination signal R2 to be supplied to one input terminal of the NAND gate 9. More specifically, the counter 10 is reset by the output $\overline{Q2}$ of "0" from the RS F/F 7, and starts a counting operation. When counted values reach a preset value the same of the counter 6, a count termination signal R2 of "0" is outputted.

A reference numeral 11 designates a velocity control signal generator circuit (hereinafter referred to as VCSG) for indicating a condition whether the motor is rotating faster than the predetermined rotating speed or slower, and for generating a fast signal F and a slow signal S both of which are able to control the rotating speed of the motor at the predetermined speed. The VCSG includes AND gates 12 and 13. The AND gate 12 produces the fast signal F by performing a logical multiply of the output Q1 from the RS F/F 3 and the output Q2 from the RS F/F 7. On the other hand, the AND gate 13 produces the slow signal S by performing the logical multiply of the output $\overline{Q1}$ from the RS F/F 3 and the output $\overline{Q2}$ from the RS F/F 7.

FIG. 9 illustrates waveforms detected at lines of the circuit shown in FIG. 8 having the above-described structure, and the operation of the conventional motor control circuit is now explained with reference to this drawing.

In accordance with the circuit of FIG. 8, a "1" pulse period K of both the output Q1 from the RS F/F 3 and the output Q2 from the RS F/F 7 is preset to be identical with a predetermined one cycle A of the FG pulse detected when the motor rotates at the predetermined rotating speed. Namely, since the "1" period K of both the output Q1 from the RS F/F 3 and the output Q2 from the RS F/F 7 represents a count period of the counters 6, 10, a count value of the counters 6, 10 is selected in such a manner that the count period coincides with the one cycle A of the FG pulse. The circuit of FIG. 8 operates in such a manner that each "1" period of the ½ FG signal coincides with the "1" period K of the output Q1 from the RS F/F 3, whereas each "1" period of the ½ FG signal coincides with the "1" period K of the output Q2 from the RS F/F 7.

Concretely, when the "1" period of the ½ FG signal is longer than the "1" period K of the output Q1 from the RS F/F 3; namely, the motor is rotating slower than the predetermined rotating speed, the slow signal S of "1" is outputted from the AND gate 13 only within a duration between when the output Q1 starts to decay and when a next trigger pulse T2 is produced. Likewise, when the "1" period of the $\overline{½\,FG}$ signal is longer than the "1" period K of the output Q2 from the RS F/F 7, the slow signal S of "1" is outputted from the AND gate 13 only within a duration between when the output Q2 starts to decay and when a next trigger pulse T1 is produced.

Conversely, when the "1" period of the ½ FG signal is shorter than the "0" period K of the output Q1 from the RS F/F 3; that is, the motor is rotating faster than the predetermined speed, the fast signal F of "1" is produced from the AND gate 12 only within a duration between the trailing edge of the output Q1 and the issue of the previous trigger pulse T2. Similarly, when the "1" period of the ½ FG signal is shorter than the "1" period K of the output Q2 from the RS F/F 7, the fast signal F of "1" is produced from the AND gate 12 only within a duration between the trailing edge of the output Q2 and the issue of the previous trigger pulse T1.

Thus, the rotation of the motor is controlled by the fast signal F or by the slow signal S obtained in the manner as mentioned above. As is apparent, when the motor is rotating at the predetermined speed, the trailing edge of the output Q1 coincides with the issue of the trigger pulse T2, and the trailing edge of the output Q2 coincides with the issue of the trigger pulse T1, and consequently neither the fast signal F nor the slow signal S is outputted.

According to the conventional motor control circuit, when the motor is driven at the predetermined rotating speed, it is necessary to set a count value of the counters 6, 10 in such a manner that the "1" period K of both the output Q1 from the RS F/F 3 and the output Q2 from the RS F/F 7 become equivalent to the one cycle A of the FG pulse. In order to match each "1" period K of the outputs with the desired cycle A, it is necessary to select the number of stages of the flip-flops, which constitute the counters 6, 10, so as to match with the cycle A precisely.

Particularly, since the "1" period K of the outputs Q1. Q2 from the RS F/Fs 3, 7 and the generation timing of the trigger pulses T1, T2 are decided on the basis of the reference clock signal CKO, the period "1" of both the fast signal F and the slow signal S is an integral product of one cycle of the reference clock signal CKO. Therefore, when the number of the flip-flops, which constitute the counters 6, 10, is small and the frequency of the reference clock signal CKO is low, the duration of the "1" period of both the fast signal F and the slow signal S is coarsely adjusted, and it is only possible to obtain the fast signal and the slow signal with low accuracy.

In order to obtain the fast signal F and the slow signal S with high accuracy, it is necessary to increase the number of the stages of the flip-flops, which constitute the counters 6, 10, and to set the frequency of the reference clock signal CKO to a higher frequency.

However, there has been a drawback in the prior art in that when the number of the flip-flops, which constitute the counters 6, 10, is set to a large number, it is difficult to integrate the control circuit for motor into a single semiconductor IC chip because of its size. Moreover, when the frequency of the reference clock is set to a high frequency, it is necessary to use elements which can respond to a fast operation. At this time, if the circuit of FIG. 8 is composed of an IIL (Integrated Injection Logic), a current dissipation increases as an injection current increases.

SUMMARY OF THE INVENTION

The purpose of the present invention is to provide a control circuit for motor which is capable of controlling the rotation of the motor with high accuracy without increasing a frequency of a reference clock signal CKO as well as without increasing the number of stages of flip-flops, which constitute a counter.

The present invention is made to solve the above-mentioned drawbacks, and in accordance with one aspect of the present invention, there is provided a control circuit for motor comprising: a velocity control circuit including a trigger pulse generation circuit for producing a trigger pulse, in synchronization with a reference clock signal, from a rotation signal detected in response to the rotation of a motor, a counter for counting the reference clock signal and for outputting a count termination signal when a counted value reaches a preset value, and an output circuit for outputting, in response to the trigger pulse and the count termination signal, either a fast signal representing that the motor rotates faster than a predetermined rotating speed or a slow signal representing that the motor rotates slower than the predetermined speed; the control circuit further comprising a phase control circuit for outputting, in response to a phase difference between the reference signal representing that the motor rotates at the predetermined speed and the rotation detection signal, either an advance signal representing that a phase-angle of the motor is advanced with respect to a predetermined value or a delay signal representing that a phase-angle of the motor is retarded with respect to the predetermined value; and a mixer for mixing an output from the velocity control signal circuit and an output from the phase control circuit, whereby the velocity control of the motor is executed prior to the phase control thereof.

The control circuit for DC motor in accordance with the present invention operates as follows.

Specifically, the velocity control circuit outputs either the fast or the slow signal in response to the rotation of the motor, and when either the advance or the delay signal is outputted from the phase control circuit, the output signals from both the velocity control circuit and the phase control circuit are mixed together in a condition that the output level of the phase control circuit is lower than that of the velocity control circuit. Accordingly, the rotation of the motor is accurately controlled by performing the velocity control prior to the phase control.

Other objects and advantages of the present invention will be apparent to those skilled in the art from the following description with reference to the appended drawings wherein like numerals denote like parts.

BRIEF DESCRIPTION OF THE ACCOMPANYING DRAWINGS

DETAILED DESCRIPTION OF THE INVENTION

Referring now to the accompanying drawings, a detail of the present invention will specifically be explained.

Figure 1:
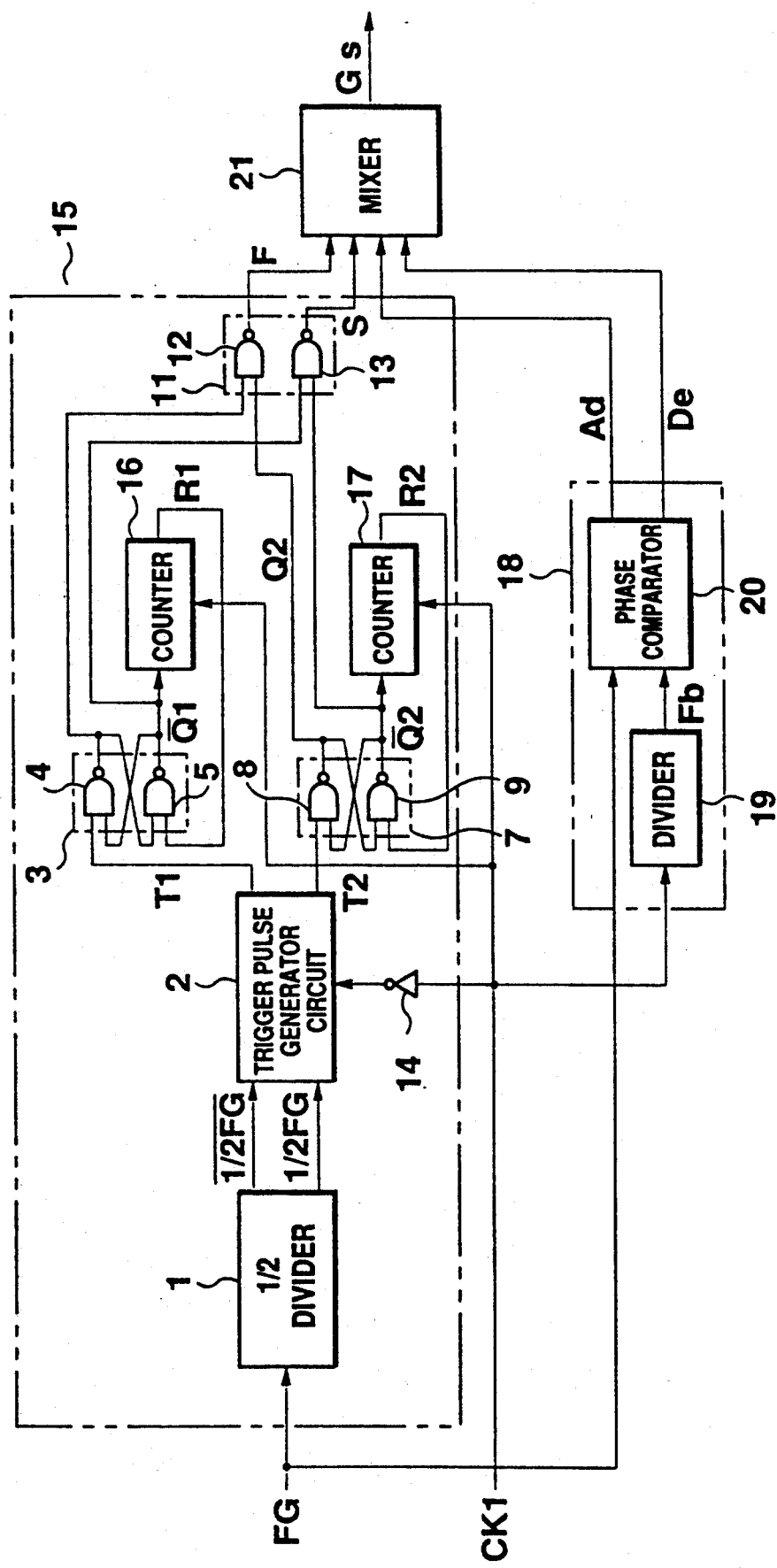
FIG. 1 is a circuit diagram illustrating a velocity/phase controller for DC servo motor in accordance with a first embodiment of the present invention.

FIG. 1, is a circuit diagram illustrating a first embodiment of the present invention.

In FIG. 1, a reference numeral 15 designates a velocity control circuit to which are applied an FG pulse generated in response to the rotation of a not-illustrated motor and the reference clock CK1 and from which is issued a fast signal F representing that the motor rotates faster than the predetermined rotating speed or a slow signal S representing that the motor rotates slower than the predetermined speed.

Figure 8:
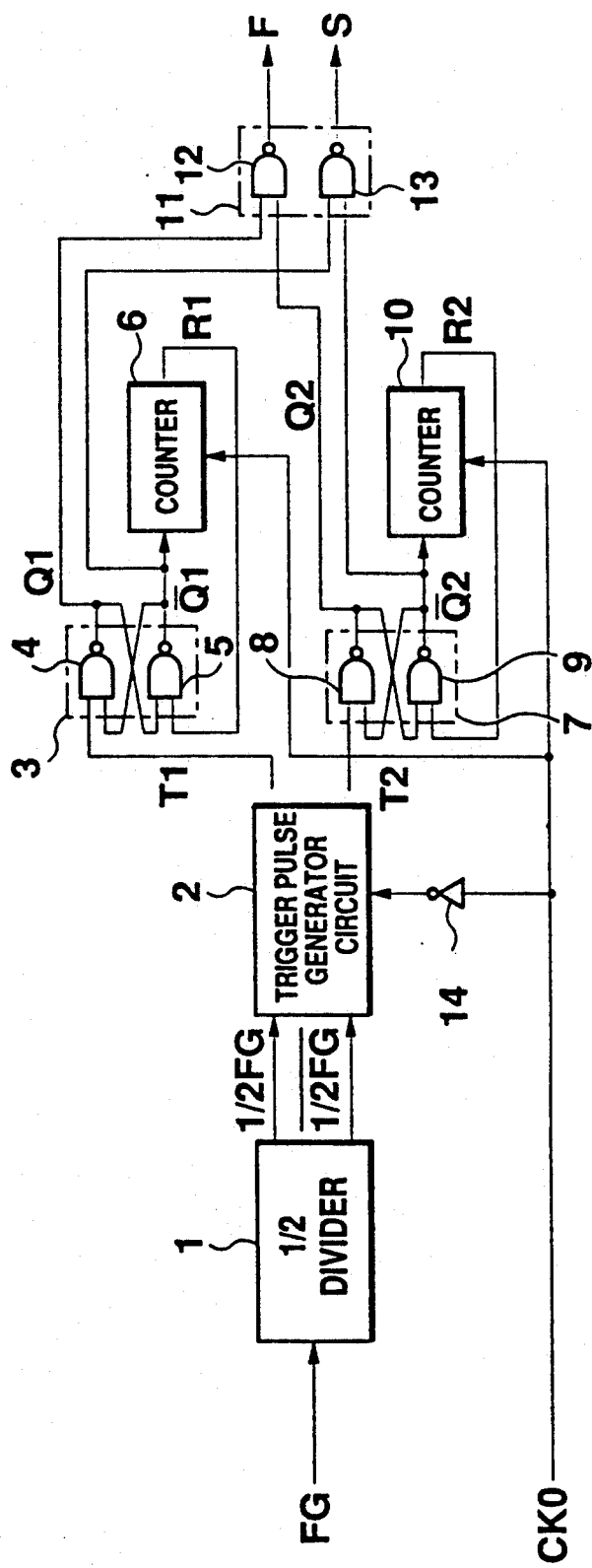
FIG. 8 is a circuit diagram illustrating a conventional motor control circuit.
Figure 9:
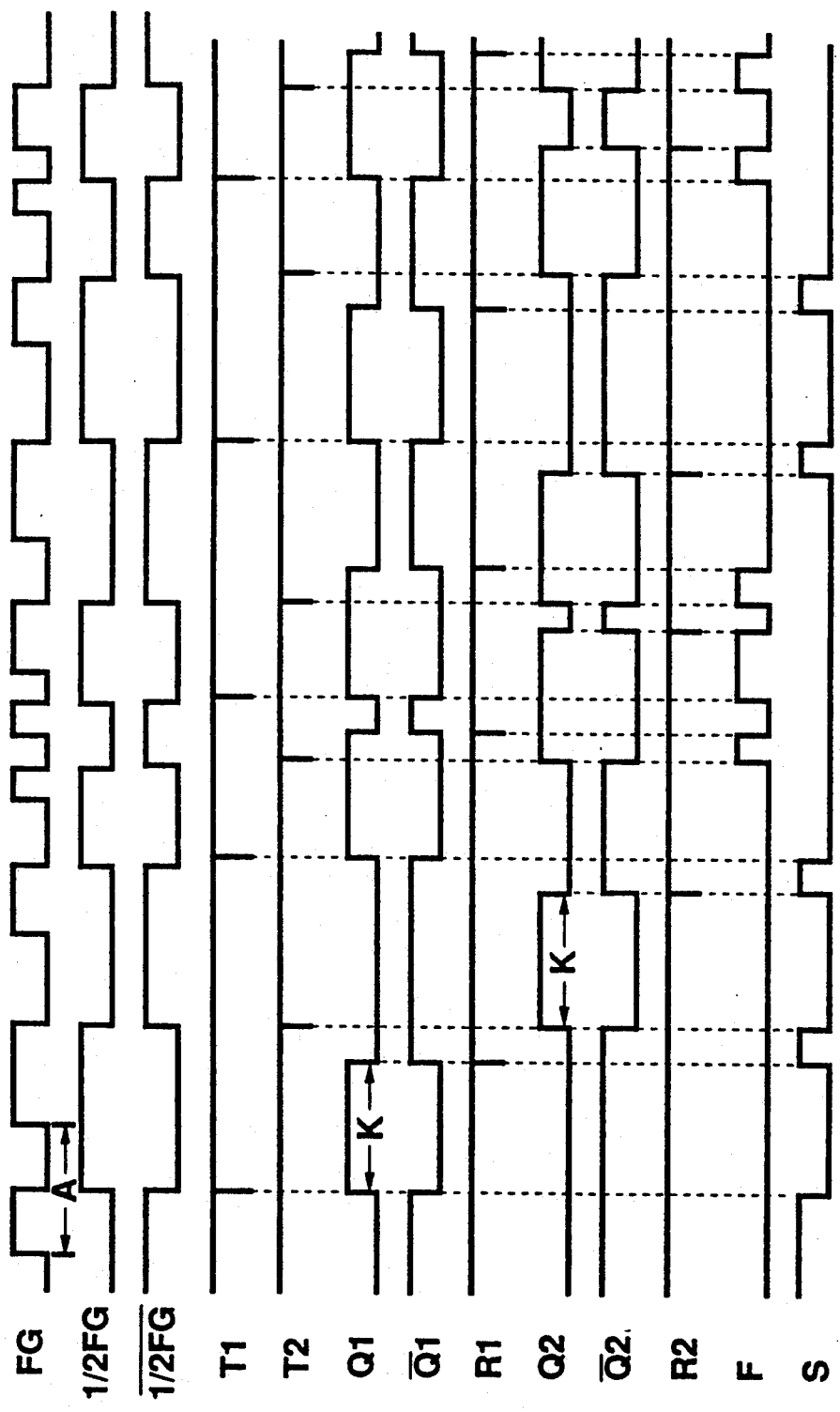
FIG. 9 is a timing chart illustrating waveforms detected at lines in the circuit of FIG. 8.

Incidentally, when a velocity control circuit 15 and the conventional motor control circuit of FIG. 8 are compared to each other, it will be understood that the counter 16 is identical with the counter 17, but they are not the same as the counters 6, 10, though they look similarly in the drawings. Specifically, the number of stages, i.e., an integral factor, of the flip-flops which constitute the counters 16, 17 is selected to be smaller than that of the conventional counters 6, 10 of FIG. 8. In the meantime, the reference clock signal CK1 has a lower frequency than the frequency of the reference clock signal CK0 of FIG. 8 in compensation for the fact that the number of the flip-flops of the counters 16, 17 is smaller than that of the counters 6, 10 of FIG. 8.

In other words, according to the present invention, it will be understood that the velocity control circuit simply requires a coarse control and a feature of the present invention is in that this coarse velocity control is finely corrected by the phase control.

The operation of the phase control in accordance with the present invention will now be described hereinbelow.

A reference numeral 18 designates a phase controller composed of a frequency divider 18 and a phase comparator 20. By the fact that the reference clock signal CK1 is supplied to the divider 19 and the FG signal is applied to the phase comparator 20, either an advance signal Ad representing that a phase-angle of the motor advances with respect to a predetermined value or a delay signal De representing that a phase-angle of the motor retards with respect to the predetermined value is outputted from the phase comparator 20. Concretely, the divider 19 consists of the flip-flops having the same number of the stages of the counters 16, 17. Namely, since a half cycle of a divided output Fb from the divider 10 is equivalent to each counting period of the counters 16, 17, the half cycle is set to be equivalent to a predetermined one cycle A of the FG pulse detected when the motor rotates at the predetermined rotating speed. Meanwhile, the phase comparator 20 compares one cycle of the divided output Fb from the divider 10 with one cycle of the FG signal, and outputs either the advance signal Ad or the delay signal De.

A reference numeral 21 designates a mixer by which an output from the velocity control signal circuit 15, such as the fast signal F and the slow signal S. and an output from the phase control circuit 18, such as the advance signal Ad and the delay signal De, are mixed together in a condition that the output level from the phase control circuit 18 is smaller than the output level from the velocity control circuit 15, whereby a mixed signal Gs is produced.

As a result, the motor performs the velocity control prior to the phase control in response to thus mixed signal Gs.

Figure 2:
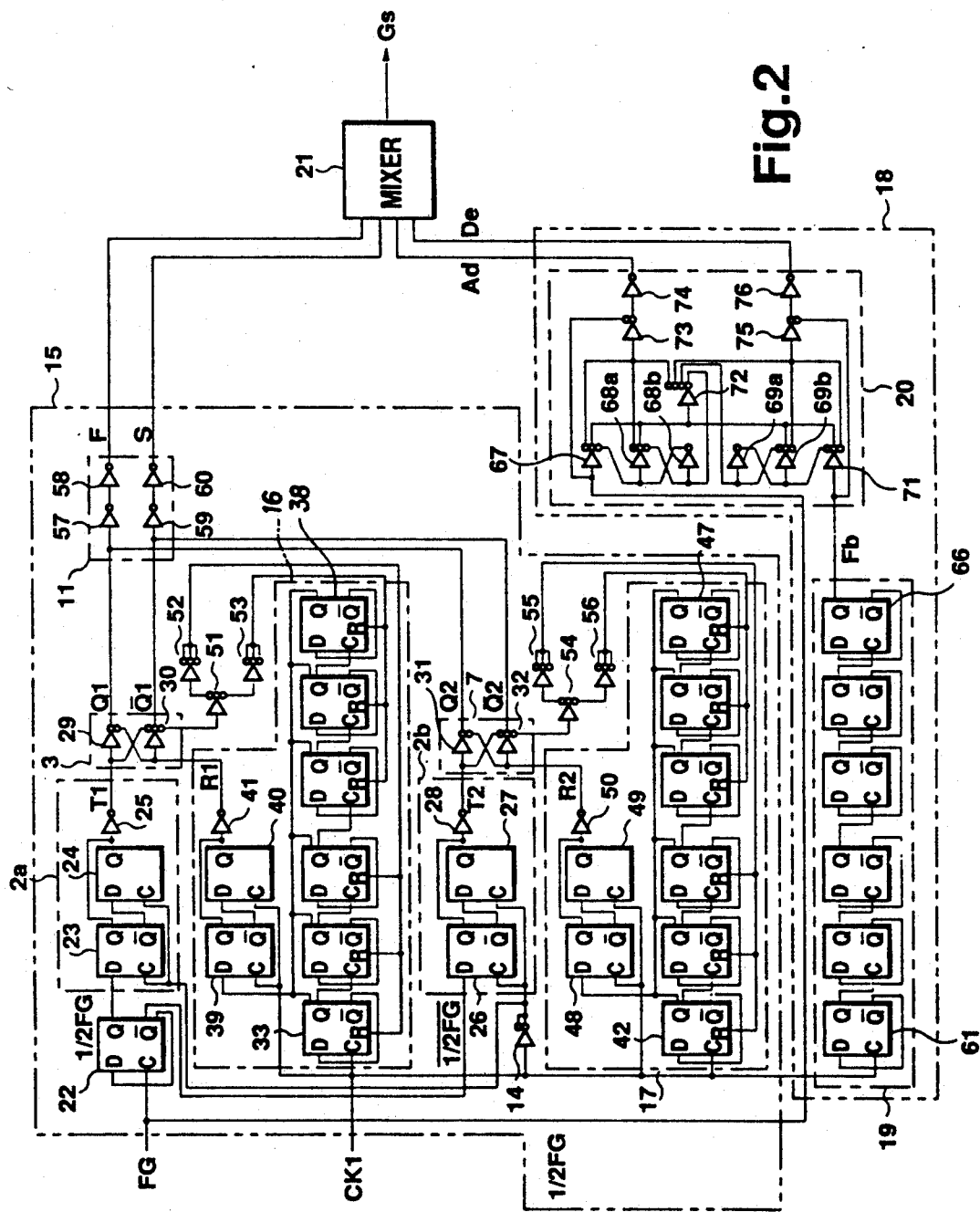
FIG. 2 is a circuit diagram illustrating a particular circuit of the velocity/phase controller of FIG. 1.

FIG. 2 is a circuit diagram of the velocity/phase controller for servo motor of FIG. 1 composed of the IIL.

In FIG. 2, a reference numeral 22 designates a D flip-flop which constitutes the ¼ divider 1. Both D (data) terminal and $\bar{Q}$ (inverted output) terminal of the D F/F is interconnected, and a ¼ FG signal is outputted from the Q (output) terminal in response to the input of the FG pulse to C (clock) terminal. A trigger pulse generator circuit 2a comprises two stages of the D F/Fs 23, 24 and an inverter 25. The $\bar{Q}$ terminal of the D F/F 23 is connected to the D terminal of the D F/F 24, and the Q terminals of the D F/Fs 23, 24 are interconnected together; moreover, the Q terminal of the D F/F 24 is connected to an input terminal of the inverter 25. Furthermore, the inverter 25 produces the trigger pulse T1 of "0" in synchronization with the inverted clock signals CK1 when the ¼ FG signal is applied to the D terminal of the D F/F 23 and the clock signal CK1, which is obtained by inverting the reference clock signal CK1, is applied to the C terminals of the D F/Fs 23, 24.

Similarly, the trigger pulse generator circuit 2b comprises D flip-flops of two stages 20, 27 and an inverter 28. When the ¼ FG signal is applied to the D terminal of the D F/F 26 and the inverted clock $\overline{CK1}$ is applied to the C terminals of the D F/Fs 26, 27, the inverter 28 produces a trigger pulse T2 of "0" in synchronization with the inverted clock $\overline{CK1}$.

The RS F/F 3 comprises the inverters 29, 30 connected to function as a flip-flop, and the trigger pulse T1 is supplied to the inverter 29. In the same way, the RS F/F 7 comprises inverters 31, 32 connected to function as a flip-flop, and the trigger pulse T2 is applied to the inverter 31.

The counter 16 comprises the D F/Fs having six stages from 33 to 38, D F/Fs 39, 40 connected to function as flip-flop, and an inverter 41. In the six-stage D F/Fs from 33 to 38, the D terminal and the $\bar{Q}$ terminal of each D F/F are connected together, and the Q terminal of the D F/F on the previous stage is connected to the C terminal of the D F/F on the following stage. Further, the Q terminals of all D F/Fs are commonly connected to the D terminal of the D F/F 39. In result, when the reference clock signal CK1 is applied to the C terminal of the D F/F 33, the counter 16 performs a counting operation until the reference clock CK1 is divided into one sixty fourth, and when the reference clock CK1 is divided into one sixty fourth, the counter 16 outputs the count termination signal R1 of "0" in synchronization with the signal CK1. The RS F/F 3 outputs Q1, $\overline{Q1}$ in response to the input of the trigger pulse T1 and the count termination signal R1, whereas the counter 16 is reset in response to the output Q1 of "1" through the inverters 51, 52, 53.

Likewise, a counter 17 comprises D F/Fs having six stages from 42 to 47, D F/Fs of 48, 49, and an inverter 50. When the reference clock signal CK1 is applied to the C terminal of the D F/F 42, the counter 17 continues its counting operation until the reference clock signal 42 is divided into one sixty fourth. If the reference clock signal CK1 is divided into one sixty fourth, the counter 17 outputs the count termination signal R2 of "0" in synchronization with the reference clock signal CK1. The RS F/F 7 outputs the Q2, $\overline{Q2}$ in response to the input of the trigger pulse T2 and the count termination signal R2, and the counter 17 is reset in response to the output $\overline{Q2}$ of "1" through the inverters 54, 55, 56.

The VCSG 11 comprises inverters 57, 58 having two stages connected in series with the output terminal Q1 of the RS F/F 3, and inverters 59, 60 having two stages connected in series with the $\overline{Q1}$ output terminal of the RS F/F 3. The logical multiply of the output Q1 from the RS F/F 3 and the output $\overline{Q2}$ from the F/F 7 is outputted as the fast signal F through the inverters 57, 58. Still, the logical multiply of the output $\overline{Q1}$ from the RS F/F 3 and the output $\overline{Q2}$ from the RS F/F 7 is outputted as the slow signal S through the inverters 59, 60.

The divider 10 comprises D F/Fs from 61 to 66 having six stages with the same structure of both the D F/Fs from 33 to 38 having six stages and the D F/Fs from 42 to 47 having six stages, the reference clock signal CK1 is applied to the C terminal of the D F/F 61, and thereafter the clock signal CK1 is divided into one sixty fourth in the same manner that the output Q from the D F/F has been divided.

The phase comparator 20 comprises inverters 67, 68a, 68b, 69a, 69b and 71-76 having six stages connected to each other. In response to that the FG signal is applied to the inverter 67 and the fact that the output Fb of the divider 19 is applied to the inverter 71, the inverter 74 outputs the advance signal Ad and the inverter 76 outputs the delay signal De.

Hereafter, these fast signal F, slow signal S, advance signal Ad, and delay signal De are mixed together by the mixer 21, and consequently outputted as a mixed signal Gs.

Figure 4:
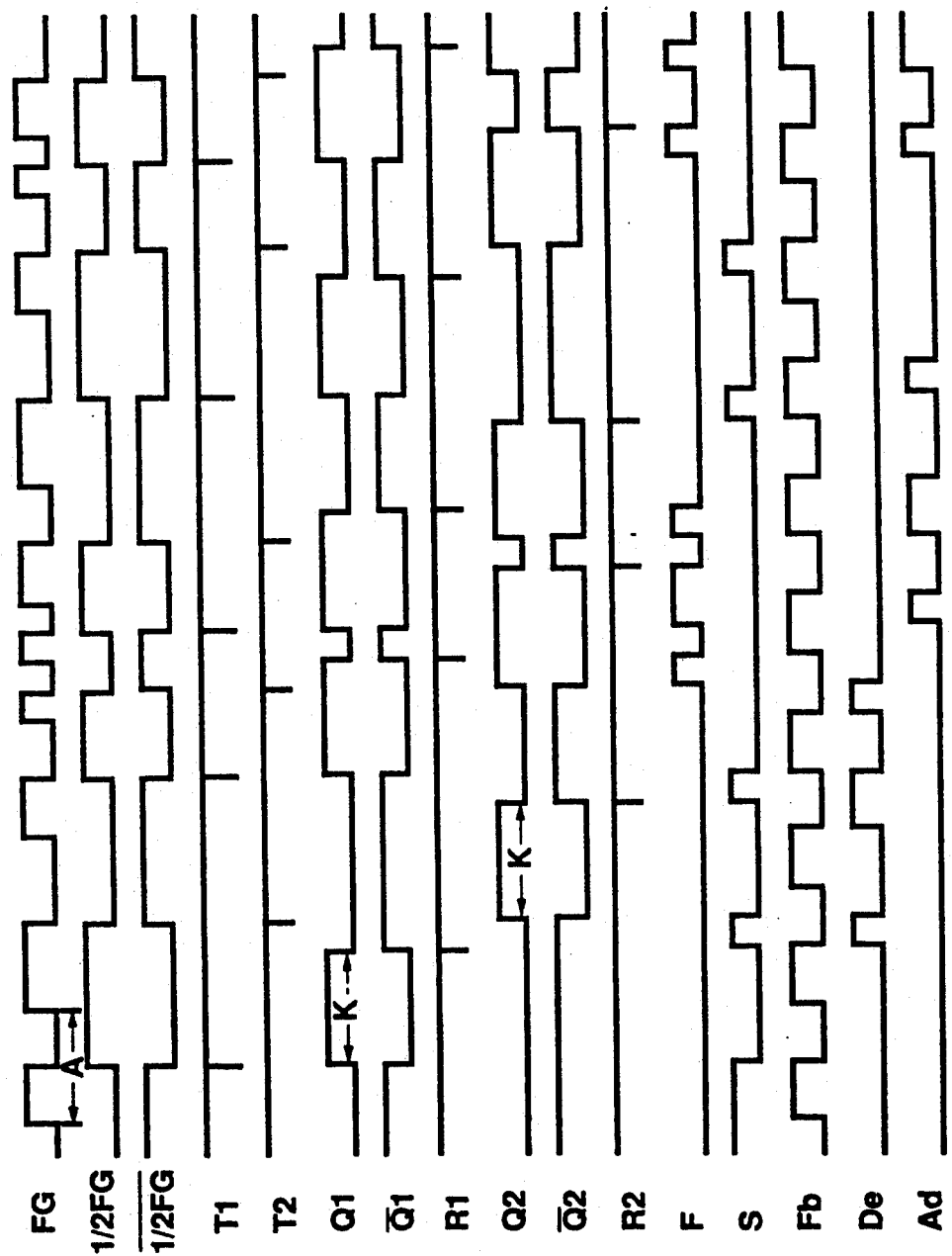
FIG. 4 is a timing chart illustrating waveforms detected at lines of the circuits of FIG. 1 and FIG. 2.

Waveforms detected at lines in the circuit of FIG. 1 having the above-described structure are as shown in FIG. 4, and the operation of the circuit will be explained hereunder.

Specifically, when the trailing edge of a period "1" of the FG signal appears prior to the trailing edge of a period "1" of the output Fb from the divider 19; namely, the phase-angle of the motor being advanced with respect to the predetermined value, the advance signal Ad of "1" is outputted within a duration between the trailing edge of the period "1" of the FG signal and the trailing edge of the period "1" of the output Fb from the divider 19. In the same manner, when the trailing edge of the period "1" of the FG signal appears following the trailing edge of the period "1" of the output Fb from the divider 19; namely, the phase-angle of the motor being retarded with respect to the predetermined value, the delay signal De of "1" is outputted within a range between the trailing edge of the period "1" of the output Fb from the divider 19 and the trailing edge of the period "1" of the FG signal.

In the mean time, the velocity control circuit 15 output the fast signal F and the slow signal S in the same manner as that of the conventional motor control circuit shown in FIG. 8.

Figure 3:
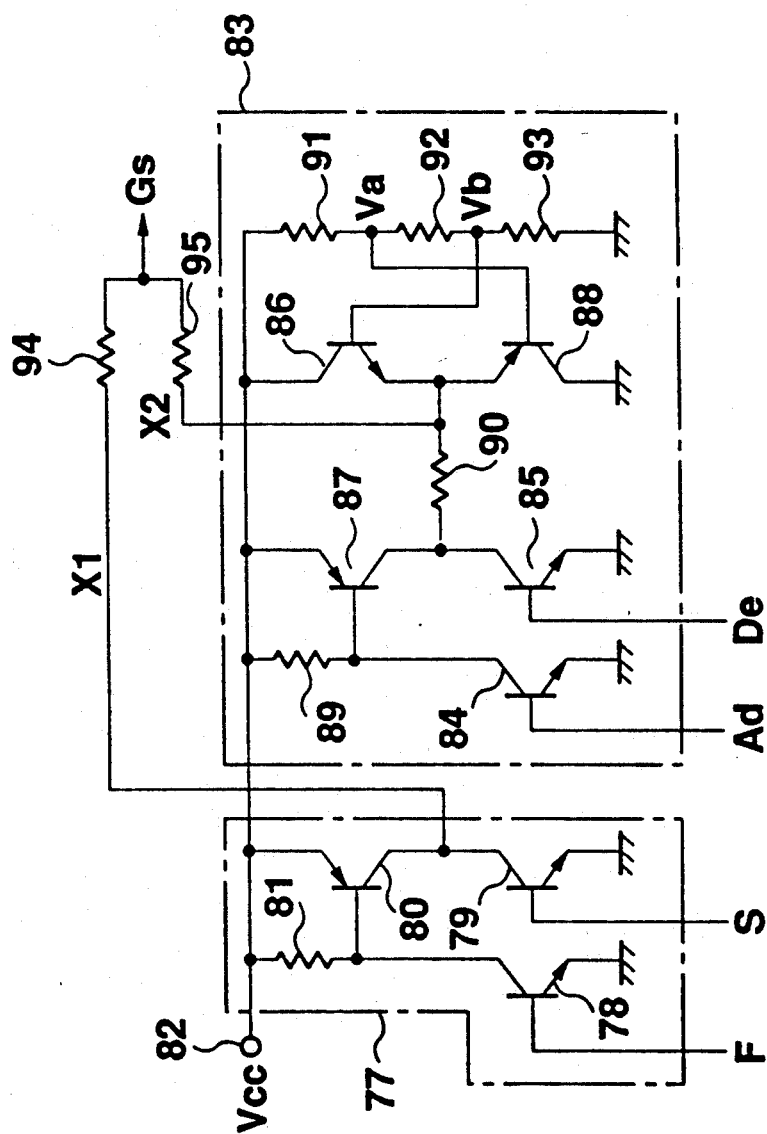
FIG. 3 is a circuit diagram illustrating a particular circuit of the mixer of FIG. 1.

FIG. 3 is a circuit diagram illustrating a particular circuit of the mixer circuit 21 for mixing the fast signal F, the slow signal S, the advance signal Ad, and the delay signal De together.

In FIG. 3, a reference numeral 77 designates a first control signal output circuit which outputs a first control signal X1 for controlling the velocity of the motor in response to the input of the fast signal F and the slow signal S from the velocity control circuit 15. In detail, the first control signal output circuit 77 is composed of N-P-N transistors 78, 79, a P-N-P transistor 80, and a resistor 81. The resistor 81 and the path between the collector and the emitter of the transistor 78 are connected in series across a power terminal 82 and earth, whereas the path between the collector and the emitter of the transistors 79, 80 are connected in series across the power terminal 82 and earth. The collector of the transistor 78 is connected to the base of the transistor 80, and the first control signal X1 is outputted from the collector junction between the transistors 79, 80.

In operation, when the fast signal F of "1" is applied to the base of the transistor 78, the transistors 78, 80 enter on, and consequently the first control signal X1 having a value approximately equivalent to the source voltage Vcc is outputted at the collector of the transistor 80.

Meanwhile, the slow signal S of "1" is applied to the base of the transistor 79, the transistor 79 enters on, and consequently the first control signal X1 having zero potential is outputted. Unless either the fast signal F of "1" or the slow signal S of "1" are applied to the first control signal output circuit 77, the collector junction between the transistors 79, 80 keeps a high impedance, and no output signal is produced in spite of the variation of the control signal X1 within a first potential range between zero and Vcc.

A reference numeral 83 designates a second control signal output circuit which outputs a second control signal X2 for controlling a phase-angle of the motor in response to the input of the advance signal Ad and the delay signal De. Particularly, the second control signal output circuit 83 comprises N-P-N transistors 84, 85, 86, P-N-P transistors 87, 88, resistors 89, 90, and series resistors 91, 92, 93. The transistors 84, 85, 87 and the resistor 89 has the same configuration as the first control signal output circuit 77, and the path between the collector and the emitter of the transistors 86, 88 is connected in series between the source terminal 82 and earth. The series resistors 91, 92, 93 are connected in series between the source terminal 82 and earth. The junction between the series resistors 91, 92 is connected to the base of the transistor 88, while the junction between the series resistors 92, 93 is connected to the base of the transistor 86. The resistor 90 is connected across the junction of the transistors 87, 85 and the junction of the transistors 86, 88, and the second control signal X2 is outputted from the junction of the transistors 86, 88.

Hence the transistors 86, 88 and the series resistors 91, 92, 93 function as a voltage clamp circuit to both the delay signal De and the advance signal Ad.

Although the transistors 84, 87 enter on when the advance signal Ad of "1" is applied to the base of the transistor 84, a maximum voltage appeared at the junction between the transistors 86, 88 is clamped to a value, smaller than the source voltage VCC and equivalent to the sum of the voltage value Va divided by the series resistors 91, 92, 93 and the base-emitter voltage of the transistor 88, and hence the second control signal X2 having thus clamped value is outputted.

On the contrary, although the transistor 85 enters on when the delay signal De of "1" is applied to the base of the transistor 85, a minimum voltage appeared at the junction between the transistors 86, 88 is clamped to a value, larger than the zero potential and equivalent to the value that is obtained by subtracting the base-emitter voltage of the transistor 86 from the voltage Vb divided by the series resistors 91, 92, 93, and hence the second control signal X2 having thus clamped value is outputted.

However, unless the advance signal Ad of "1" or the delay signal De of "1" are applied to the control signal output circuit 83, the collector junction between the transistors 86, 88 holds a high impedance, and consequently the control signal X2 varies within a second potential range narrower than the first potential range.

A reference numeral 94 designates a first output resistor to which the first control signal X1 is applied. Also, a reference numeral designates a second output resistor, having a larger resistance value than that of the first output resistor 94 to which the second control signal X2 is applied. Although an output from the resistor 95 becomes smaller than an output of the resistor 94, there is no necessity of extremely increasing the resistance value of the resistor 95 because the level of the second control signal X2 has previously been set to be smaller than the level of the first control signal X1. It will be sufficient if the values of the resistor 94 and the resistor 95 are set to 10kΩ and 220kΩ, respectively, for example.

Accordingly, there will be obtained the mixed signal Gs for performing a velocity control prior to a phase control in response to that the outputs of the resistors 94, 95 are mixed together with a different level.

Here, as mentioned above, since the resistance value of the resistor 95 is not extremely large, that is, 220kΩ or so, it is possible to select the resistance value of the resistor 95 in compliance with various types of motors with ease.

According to the first embodiment of the present invention having the above-described structure, if the accuracy of the fast signal F and the slow signal S, both of which cause a step change based on a unit equivalent to one cycle of the reference clock signal CK1, is deteriorated, the rotational errors are linearly compensated, and the rotation of the motor can properly be controlled because the motor is controlled in its phase-angle as well as in its velocity.

With this result, it becomes possible to reduce the number of stages of the flip-flops, which constitute the counters 16, 17, built in the velocity control circuit 15. In addition, the phase comparator 20 can be simplified because the motor is already in a state that the velocity of the motor has been coarsely compensated when the phase-angle of the motor is about to be controlled, whereby it becomes possible to provide a control circuit for motor suitable for being integrated into a single semiconductor IC chip. Moreover, since the frequency of the reference clock signal CK1 can be reduced, it is possible to prevent the injection currents from increasing even when the circuit of FIG. 1 is composed of the IIL; in other words, it will be possible to prevent the increase of the power dissipation.

Figure 5:
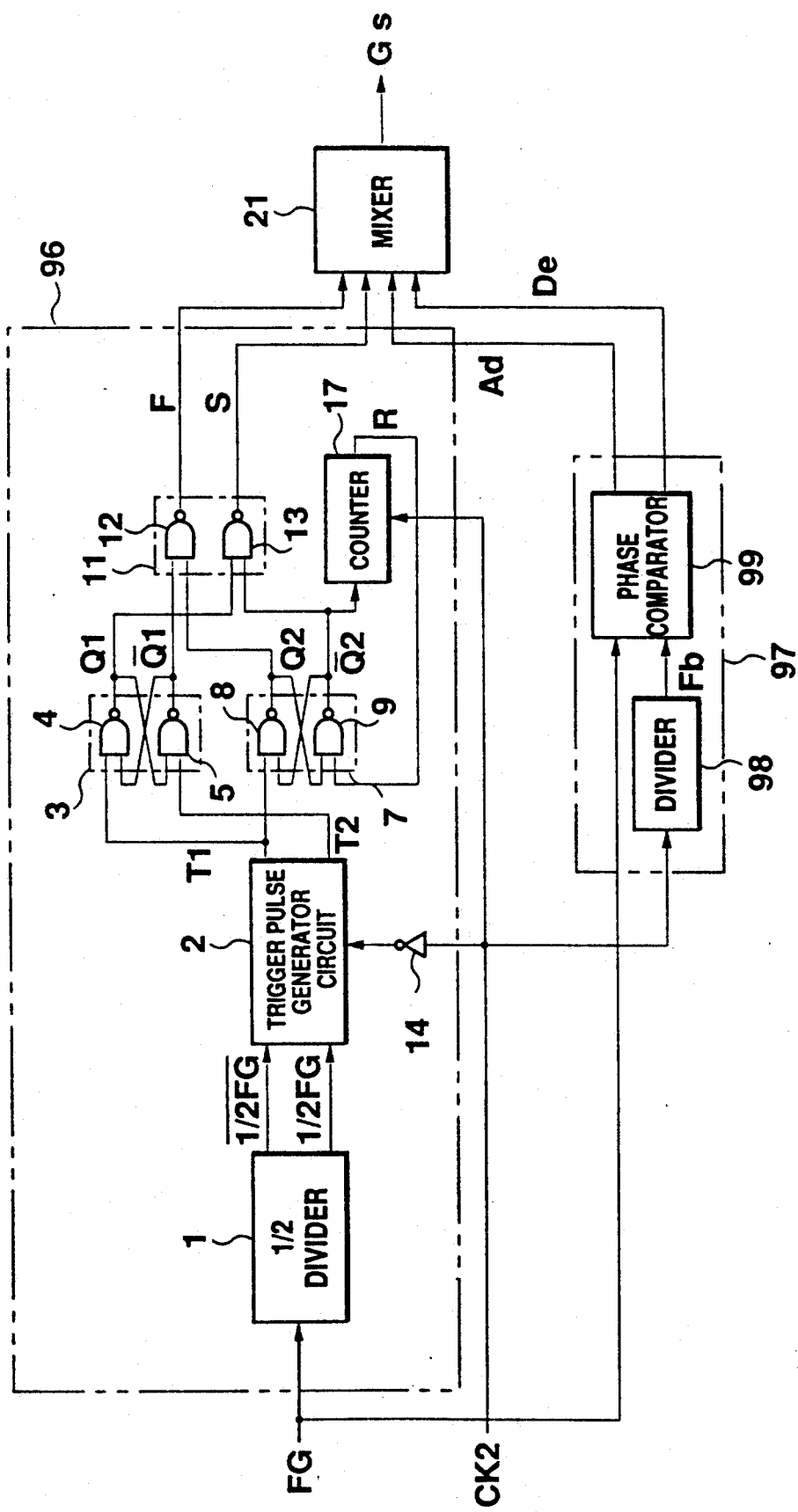
FIG. 5 is a circuit diagram illustrating a velocity/phase controller for DC servo motor in accordance with a second embodiment of the present invention.

Now, FIG. 5 is a circuit diagram illustrating a second embodiment of the present invention.

In FIG. 5, a reference numeral 96 designates a velocity control circuit to which the FG pulse generated in response to a rotation of the motor and the reference clock signal CK2 are applied and from which the fast signal F and the slow signal S are outputted. With this configuration, when comparing the velocity control circuit 96 with the corresponding circuit of the first embodiment, a difference is in that the counter 16 shown in FIG. 1 is deleted, and the connection among the trigger pulse generator circuit 2, the RS F/Fs 3, 7, and the VCSG differs from that of FIG. 1.

More specifically, to one input terminal of the NAND gates 4, 5, which constitute the RS F/F 3, are respectively applied the trigger pulses T1, T2, whereas to one input terminal of the NAND gate 8, which constitutes the RS F/F 7, is applied the trigger pulse T1. To the two input terminals of the AND gate 12, which constitutes the VCSG 11, are applied both the inverted output Q1 from the NAND gate 5 and the output Q2 from the NAND gate 8. Meanwhile, at the two input terminals of the NAND gate 13, which constitutes the VCSG 11, are supplied both the output Q1 from the NAND gate 4 and the inverted output Q2 from the NAND gate 9.

A reference numeral 97 designates a phase control circuit comprising a divider 98 and a phase comparator 99. The phase control circuit 97 outputs either the advance signal Ad or the delay signal De in response to the input of both the reference clock signal CK2 and the FG signal. In the meantime, the divider 98 is composed of flip-flops having the same number of stages of the counter 17.

Accordingly, a mixed signal Gs is produced by mixing thus obtained fast signal F, the slow signal S, the advance signal Ad, and the slow signal De together.

Figure 6:
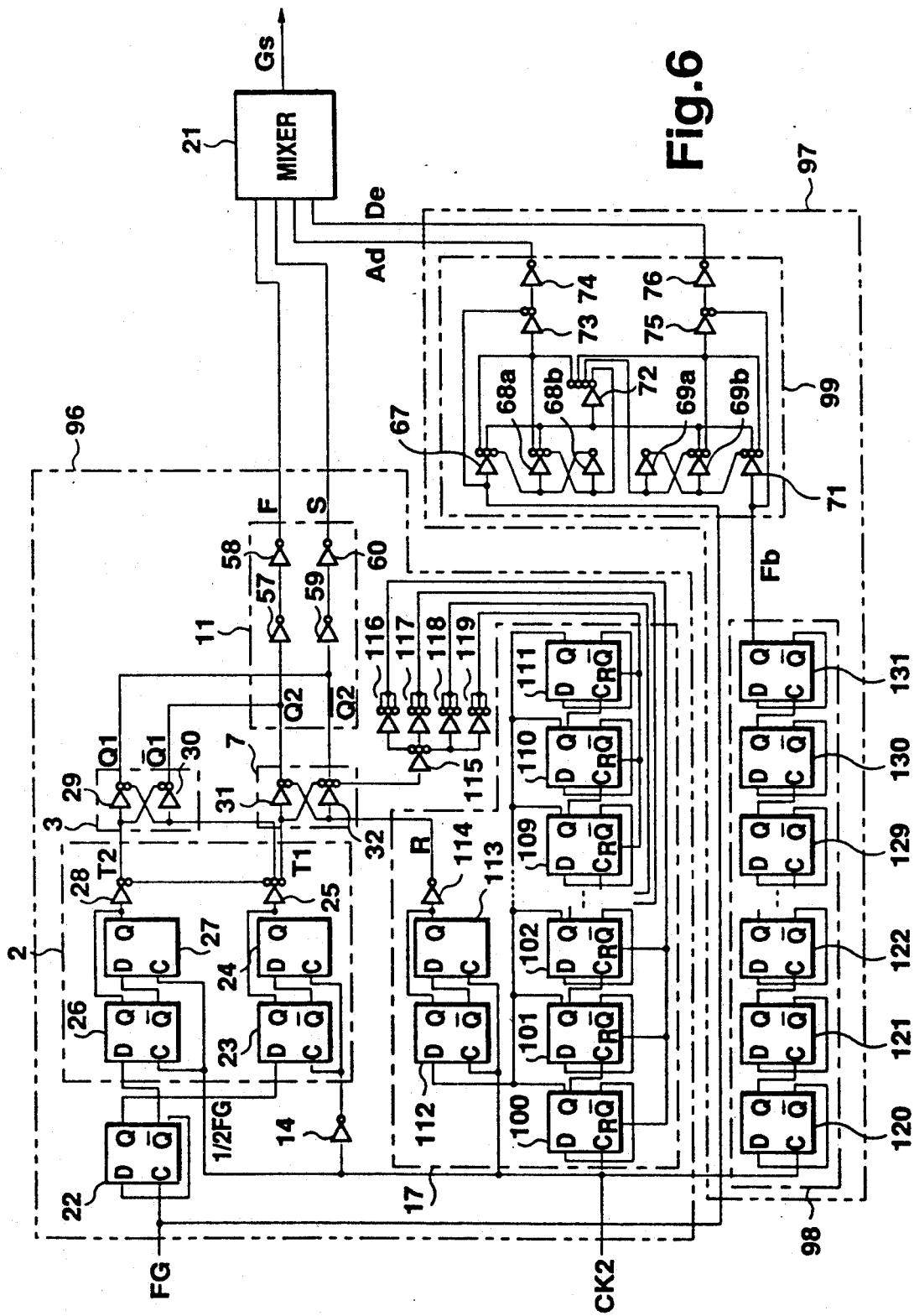
FIG. 6 is a circuit diagram illustrating a particular circuit of the velocity/phase controller of FIG. 5.

FIG. 6 is a circuit diagram illustrating the particular circuit of FIG. 5 which is constituted of the IIL.

In FIG. 6, a counter 17 comprises D F/Fs having twelve stage from 100 to 111, D F/Fs 112, 113, and an inverter 114. Further, the RS F/F 7 outputs Q2, Q2 in response to the input of both the trigger pulse T1 and the count termination signal R, and the counter 17 is reset by the output Q2 through inverters from 115 to 119. The divider 98 is composed of D F/Fs having twelve stages from 120 to 131 with the same structure of the D F/Fs from 100 to 111. In FIG. 6, same numerals denote the corresponding parts shown in FIG. 2.

Figure 7:
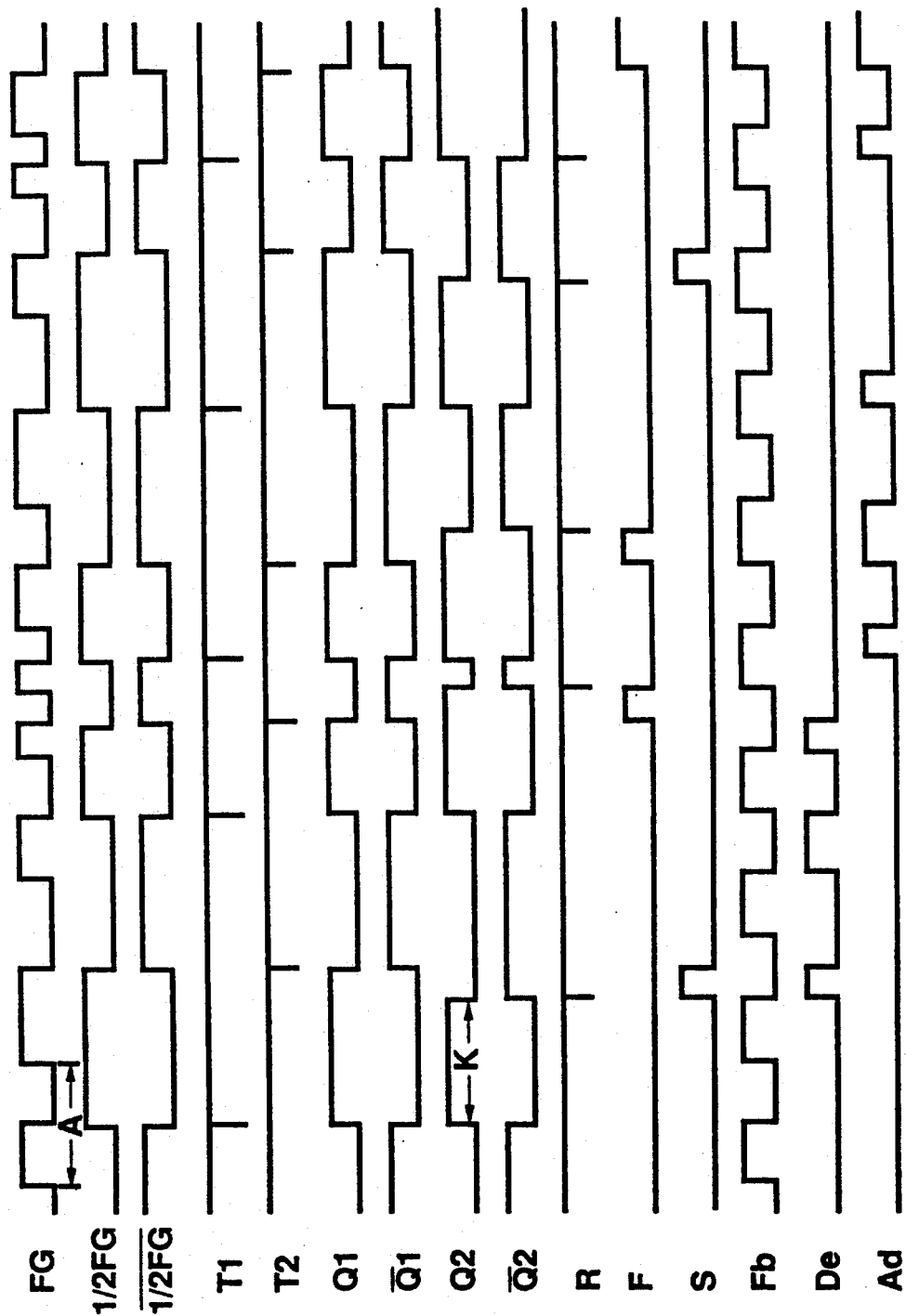
FIG. 7 is a timing chart illustrating waveforms detected at lines in the circuits of FIG. 5 and FIG. 6.

FIG. 7 is a timing chart showing waveforms detected at lines in the circuit of FIG. 5. Like the first embodiment, there are obtained the fast signal F, the slow signal S, the advance signal Ad, and the slow signal De.

According to the second embodiment of the present invention having the above-described structure, since there is provided only one counter at the inside of the velocity control counter 96, the interval for generating pulses is extended, thereby deteriorating the accuracy of the signals. However, since the motor is controlled not only in its velocity but by its phase-angle, the rotational errors are linearly compensated, and consequently the rotation of the motor is accurately controlled. Therefore, it becomes possible to simplify the configuration of the velocity control circuit 96 according as the number of the counters is reduced, and to provide a control circuit for motor suitable for being integrated into a single semiconductor IC chip like the first embodiment.

As the matter of course, in accordance with the present invention, the number of stages of the flip-flops which constitute the counter, is not limited to the numbers discussed in the first and the second embodiments, and it is possible to reduce the size of an IC by decreasing the number of the flip-flops to be embedded.

According to the present invention, the rotation of the motor is securely controlled by mixing the output signal from the velocity control circuit for controlling the speed of the motor and the output signal from the phase control circuit for controlling the phase-angle of the motor. Particularly, since the rotation control of the motor is assured by performing the phase control after the rotating speed control of the motor is completed, it becomes possible to simplify the structure of both the velocity control circuit and the phase control circuit, thereby realizing the reduction of the size of an IC when the control circuit for motor embodying the present invention is integrated into a semiconductor IC chip. As another advantage, if the control circuit for a motor in accordance with the embodiment is constituted by the IIL, it becomes possible to reduce the power dissipation because it becomes unnecessary to increase the frequency of the reference clock signals.

What is claimed is:

1. A velocity/phase controller for a DC servo motor comprising:
   (a) a velocity control circuit including
      a trigger pulse generator for producing a trigger pulse in synchronization with a reference clock signal from a rotation detection signal detected in response to a rotation of the DC servo motor, a counter for counting said reference clock signal and outputting a count termination signal when a counted value reaches a preset value, and a velocity control signal generator for outputting, on a basis of the trigger pulse and the count termination signal, a fast signal when said DC servo motor is rotating faster than a predetermined rotating speed and a slow signal when said DC servo motor is rotating slower than said predetermined rotating speed;

(b) a phase control circuit for outputting an advance signal when a phase-angle of said DC servo motor is advanced relative to a predetermined value and a delay signal when the phase angle of said DC servo motor is retarded relative to said predetermined value in response to a phase difference between a reference signal which represents said DC servo motor rotating at said predetermined rotating speed and said rotation detection signal;

(c) a mixer for outputting a rotation control signal for said DC motor by generating a first output having a first amplitude range and a second output having a second amplitude range smaller than the first amplitude range, the first output being generated from at least one of said fast signal and said slow signal and the second output being generated from at least one of said advance signal and said delay signal, said mixer performing a mixing operation so that a control function of the rotation control signal is preponderantly due to the contribution of the first output.

2. A velocity/phase controller for DC servo motor according to claim 1, wherein said phase control circuit further comprises:

(a) a divider for outputting a reference phase signal which corresponds to a phase of said rotation signal detected from said DC motor rotating at said predetermined rotating speed; and (b) a phase comparator for outputting either said advance signal or said delay signal by comparing said reference phase signal with a phase of said rotation signal detected from said DC motor.

3. A velocity/phase controller for DC servo motor according to claim 2, wherein said divider further comprises a flip-flop dividing circuit having the same number of stages as the stages of said counter of said velocity control circuit.

4. A velocity/phase controller for DC servo motor according to claim 1, wherein said mixer further comprises:

(a) a first control signal output circuit for outputting a first control signal in response to either said fast signal or said slow signal supplied from said velocity control circuit;

(b) a second control signal output circuit for outputting a second control signal in response to either said advance signal or said delay signal supplied from said phase control circuit; and (c) an adder including a first output resistor to which said first control signal is supplied and a second output resistor to which said second control signal is supplied.

5. A velocity/phase controller for DC servo motor according to claim 4, wherein a potential of said advance signal is clamped to be lower than a potential of said fast signal and a potential of said delay signal is clamped to be higher than a potential of said slow signal.

6. A velocity/phase controller for DC servo motor according to claim 5, wherein said first control signal output circuit further comprises a pair of transistors each of which outputs a first control signal approximately equivalent to a source voltage or the earth voltage in response to an input of either said fast signal or said slow signal, and said second control signal output circuit further comprises a pair of transistors each of which outputs a second control signal clamped lower than a source voltage or higher than the earth voltage in response to an input of said advance signal or said delay signal.

7. A velocity/phase controller for DC servo motor according to claim 6, wherein, in order to clamp said second control signal, said second control signal output circuit further comprises a group of resistors connected in series for dividing voltage differences between said source voltage and the earth voltage, and a clamping circuit for clamping each output from said pair of transistors based on each of said divided voltages.

8. A velocity/phase controller for DC servo motor according to claim 4, wherein said first output resistor to which said first control signal is input has a lower resistance value than a resistance value of the second output resistor to which said second control signal is input.

9. The velocity/phase controller of claim 1, wherein said velocity control signal generator generates velocity control output having a predetermined amplitude by modulating a pulsewidth of at least one of said fast signal and said slow signal.

10. The velocity/phase controller of claim 1, wherein said phase control circuit generates said phase control output having a predetermined amplitude by modulating a pulsewidth of at least one of said advance signal and said delay signal.

11. The velocity/phase controller of claim 1, wherein said mixer modulates an amplitude range of a velocity control output from said velocity control signal generator and an amplitude range of a phase control output from said phase control circuit such that an amplitude of the rotation control signal is influenced to a greater extent by the velocity control output from said velocity control signal generator than the phase control output from the phase control circuit.

* * * * *